(12) United States Patent
Boydstun

(10) Patent No.: US 8,306,064 B2
(45) Date of Patent: Nov. 6, 2012

(54) SYSTEM AND METHOD FOR EXTENDING COMMUNICATION PROTOCOLS

(75) Inventor: Roger L. Boydstun, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 431 days.

(21) Appl. No.: 12/352,217

(22) Filed: Jan. 12, 2009

(65) Prior Publication Data
US 2010/0177787 A1    Jul. 15, 2010

(51) Int. Cl.
*H04J 3/24* (2006.01)
(52) U.S. Cl. .......................... 370/474; 370/389; 370/392
(58) Field of Classification Search .................. 370/216, 370/229, 230, 252, 280, 350, 352, 389, 392, 370/328, 400, 401, 402, 403, 466, 447, 473, 370/474, 487, 471; 714/752, 776, 786; 710/105; 709/219, 223, 230, 232; 726/15
See application file for complete search history.

(56) References Cited

U.S. PATENT DOCUMENTS

| | | | | |
|---|---|---|---|---|
| 5,565,927 A * | 10/1996 | Van Gestel | ..................... | 348/467 |
| 6,085,238 A * | 7/2000 | Yuasa et al. | .................... | 709/223 |
| 6,132,072 A * | 10/2000 | Turnbull et al. | ............. | 362/494 |
| 6,192,282 B1 * | 2/2001 | Smith et al. | ...................... | 700/19 |
| 6,462,654 B1 * | 10/2002 | Sandelman et al. | .......... | 340/506 |
| 6,501,948 B1 * | 12/2002 | Salin | ............................. | 455/417 |
| 6,845,230 B2 * | 1/2005 | Syed | ............................. | 455/3.02 |
| 7,133,404 B1 * | 11/2006 | Alkhatib et al. | .............. | 370/392 |
| 7,433,740 B2 * | 10/2008 | Hesse et al. | ....................... | 700/1 |
| RE41,024 E * | 12/2009 | Alkhatib et al. | .............. | 370/392 |
| 7,697,492 B2 * | 4/2010 | Petite | ............................. | 370/338 |
| 2002/0019725 A1 * | 2/2002 | Petite | ............................. | 702/188 |
| 2002/0145974 A1 * | 10/2002 | Saidi et al. | ..................... | 370/230 |
| 2003/0198252 A1 * | 10/2003 | Thrysoe | ........................ | 370/466 |
| 2004/0057450 A1 * | 3/2004 | Okuyama | ...................... | 370/447 |
| 2004/0148041 A1 * | 7/2004 | Cassiolato et al. | ............. | 700/90 |
| 2004/0215807 A1 * | 10/2004 | Pinder et al. | .................. | 709/232 |
| 2005/0188076 A1 * | 8/2005 | Rayburn et al. | ............... | 709/224 |
| 2006/0168618 A1 * | 7/2006 | Choi | ............................... | 725/37 |
| 2006/0192434 A1 * | 8/2006 | Vrla et al. | ........................ | 307/64 |
| 2006/0272015 A1 * | 11/2006 | Frank et al. | ..................... | 726/15 |
| 2007/0057783 A1 * | 3/2007 | Reller | ........................... | 340/538 |
| 2007/0140691 A1 * | 6/2007 | Gao et al. | ........................ | 398/38 |

(Continued)

OTHER PUBLICATIONS

Marketing Guide, Interoperability in the building controls industry; Jan. 2000; Literature Order No. BAS-SLM001-EN; The Trane Company, La Crosse, Wisconsin; 43 pgs.

*Primary Examiner* — Abdullah Riyami
(74) *Attorney, Agent, or Firm* — Conley Rose, P.C.; J. Robert Brown, Jr.

(57) ABSTRACT

A system and method are provided for extending a communication protocol by constructing a top level message, constructing a first level extension message, and embedding the first level extension message in a data component of the top level message. Also, a system and method are provided for extending a communication protocol by receiving a top level message from a communication medium, determining whether a first level extension message is included within the top level message, and extracting the first level extension message from the top level message. Further, a system and method are provided for extending a communication protocol by using a processor to embed a first level extension packet within a top level packet. At least one of the top level packet and the first level extension packet include a message for use in an HVAC system.

19 Claims, 2 Drawing Sheets

U.S. PATENT DOCUMENTS

| | | | |
|---|---|---|---|
| 2007/0165676 A1* | 7/2007 | Kato | 370/487 |
| 2008/0043731 A1* | 2/2008 | Lim et al. | 370/389 |
| 2008/0192774 A1* | 8/2008 | Singh et al. | 370/473 |
| 2008/0274689 A1* | 11/2008 | Kuban | 455/7 |
| 2008/0282005 A1* | 11/2008 | Chencinski et al. | 710/105 |
| 2009/0274077 A1* | 11/2009 | Meylan et al. | 370/280 |
| 2009/0299503 A1* | 12/2009 | Oster et al. | 700/81 |
| 2009/0303871 A1* | 12/2009 | Kim et al. | 370/216 |
| 2009/0327843 A1* | 12/2009 | Palanki et al. | 714/776 |
| 2010/0014463 A1* | 1/2010 | Nagai et al. | 370/328 |
| 2010/0114583 A1* | 5/2010 | Lee et al. | 704/500 |
| 2010/0121999 A1* | 5/2010 | Isenmann et al. | 710/105 |

* cited by examiner

SYSTEM AND METHOD FOR EXTENDING COMMUNICATION PROTOCOLS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Communication protocols are rules or standards that set forth or define data formats for communication between two or more devices. A drawback of existing communication protocols in the heating, ventilating and air conditioning (HVAC) field is that limitations are often imposed on the number and/or type of messages that communicating devices can send and receive. For example, third party protocol supplier in the communication or control fields develop and license communication protocols for use by HVAC system manufacturers and manufacturers in other fields that enable these manufacturers to configure, encode, and use manufacturer-specific messages that facilitate communication between devices within conventional software frameworks.

SUMMARY OF THE DISCLOSURE

In some embodiments, a system is provided for extending a communication protocol. The system comprises a component configured to construct a top level message in accordance with a communication protocol. The component is further configured to construct a first level extension message in accordance with the communication protocol. Still further, the component is configured to embed the first level extension message in a data component of the top level message.

In other embodiments, a method is provided for extending a communication protocol. The method comprises receiving a top level message from a communication medium and determining whether a first level extension message is included within the top level message. If a first level extension message is included within the top level message, the method proceeds to extract the first level extension message from the top level message and store the first level extension message in a computer-readable medium.

In still other embodiments, a system for extending a communication protocol is provided that includes a processor configured to construct a top level packet and further configured to construct a first level extension packet and embed the first level extension packet within the top level packet. At least one of the top level packet and the first level extension packet comprise a message for use in an HVAC system.

The various characteristics described above, as well as other features, will be readily apparent to those skilled in the art upon reading the following detailed description of the embodiments of the disclosure, and by referring to the accompanying drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
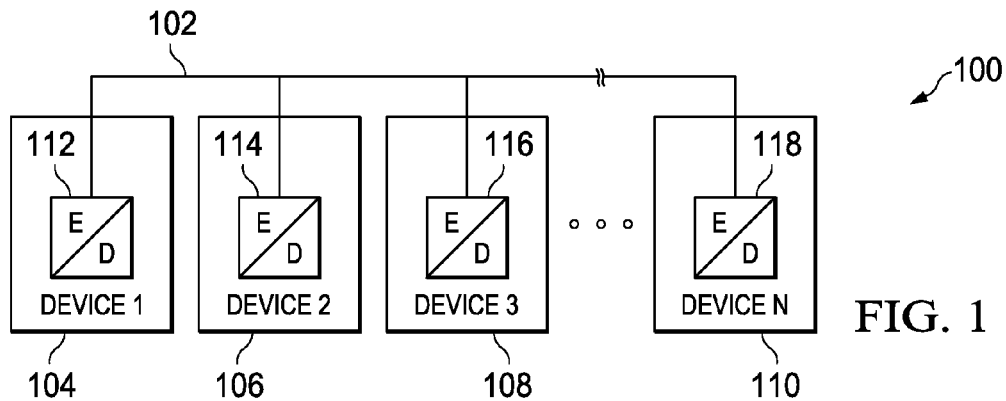
FIG. 1 is a block diagram of a communication system that may be used to implement one or more embodiments of the disclosure.

It should be understood at the outset that although illustrative implementations of one or more embodiments of the present disclosure are provided below, the disclosed methods and/or systems may be implemented using any number of techniques, whether currently known or in existence. This disclosure should in no way be limited to the illustrative implementations, drawings, and techniques illustrated below, including the exemplary designs and implementations illustrated and described herein, but may be modified within the scope of the appended claims along with their full scope of equivalents.

Some communication protocols, such as Controller Area Network (CAN) and CAN-like protocols (such as Honeywell's EnviraCOM and Emerson's ClimateTalk) are packet based that utilize message identifiers and data. HVAC protocol developers and suppliers will purposefully define message identifiers to encapsulate a standard set of behaviors for interchange between devices. Messages that encompass a standardized behavior are known as standard message identifiers and may be grouped into classes of similar function known as message classes. Message identifiers that may remain undefined or be assigned to groups that provide means of extending the protocol are also known as manufacturer-specific message identifiers. A defined set of message identifiers will generally comprise standard message identifiers that are usable by and/or helpful to Original Equipment Manufacturers (OEM's) that adopt the communication protocol. However, when an OEM manufacturer determines that no standard message identifier properly serves the needs of that manufacturer, that manufacturer may petition the protocol developer to make use of one or more of unused message identifier by converting an unused message identifier to a manufacturer-specific message identifier. Sometimes, protocol suppliers will restrict usage of the number and/or type of manufacturer-specific communication messages that HVAC manufacturers may use. Specifically, HVAC protocol suppliers (Honeywell and Emerson) limit the number of messages an OEM protocol adopter may use in a systems implementation even though the maximum number of messages possible for the specific protocol are in the thousands of messages. Honeywell limits each OEM to a limited number "manufacturer-specific" message identifiers in an effort to ensure that message identifiers are available for use by other OEMs and protocol adopters. Consequently, the present disclosure provides for increasing the number and/or type of manufacturer-specific messages that may be used by a single manufacturer under the above-described limitations.

When a protocol's unused message identifier, is encoded for manufacturer-specific use, the message identifier are sometimes used for encoding manufacturer or device specific information. The data bytes in the manufacturer-specific messages may be used in any way the manufacturer desires for flexibility and innovative use of the protocol. Further, if the manufacturer desires to communicate more information than can fit in its already reserved manufacturer-specific message identifier, one or more of the data bytes of a message may be used to identify the meaning of the remaining bytes of that message. However, it is not required that manufacturers use all of the available bytes in the data field of the manufacturer-specific messages.

As disclosed herein, a header portion of a manufacturer-specific message may be used to "notify" a codec that the contents within a data portion of the manufacturer-specific message may be another message. The present disclosure provides for embedding and/or nesting an extension message (or extension packet) within a top level message (or top level packet). The extension message (or extension packet) is sufficiently compliant with the protocol and/or format of the top level message (or top level packet) so that the extension message (or extension packet), after its extraction from the top level message, can be treated or processed similar to the manner in which the top level message is processed.

Some communication protocols, such as HTTP, are defined by committee and are generic, thereby offering very little opportunity for structural modification of packets (i.e. the header fields of packets) to suit the needs of a particular manufacturer, such as an HVAC manufacturer. In such committee defined protocols, an HVAC manufacturer may be limited to implementing manufacturer-specific features within a data portion of the protocol. Accordingly, it will be appreciated that implementation of the above-described embedding and/or nesting of an extension message (or extension packet) within a top level message (or top level packet) may be implemented within a data portion of a packet of a protocol such as HTTP. Further, similar embedding and/or nesting of an extension message (or extension packet) within a top level message (or top level packet) may be used to extend a protocol that was designed with too few available message identifiers during the inception and development of the protocol.

Considering that other HVAC protocols, such as, but not limited to, Emerson Technologies' ClimateTalk protocol allow HVAC manufacturers the ability to define their own manufacturer-specific messages without the above-described limitation in type and number, it is clear that restrictive and proprietary protocols present unique challenges for HVAC manufacturers. Accordingly, the above described embedding and/or nesting of an extension message (or extension packet) within a top level message (or top level packet) may be useful to HVAC (and other) manufacturers when a protocol restricts the manufacturers ability to freely create additional manufacturer-specific messages or manufacturer-specific messages of a type that is otherwise forbidden.

FIG. 1 is a block diagram of a communication system 100, according to the disclosure. Communication system 100 comprises a communication medium 102 that is in communication with and operably connected to a plurality of communicating devices 104, 106, 108, and 110. In some embodiments, communication medium 102 may be implemented as a communication bus. In other embodiments, communication medium 102 may be implemented using any suitable medium capable of facilitating or providing communication between communicating devices, such as for example, short-range, medium-range, or long-range wireless communication, wireline communication, fiber optics, coaxial cable, and the like. Also, although four communicating devices 104, 106, 108, and 110 are shown, it should be understood that as few as two or more communicating devices may be used. For example, device "N" may represent a second communicating device in a system of two communicating devices, or a third communicating device in a system of three communicating devices. In other words, communicating device N 110 is intended to represent the "Nth" device in a system of "N" communicating devices.

In this embodiment, communicating device 104 is an HVAC system component or unit, such as, but not limited to, an air handler, a furnace, an air conditioner, a refrigeration unit, a thermostat, or a heat pump. Communicating device 106 is a control unit (e.g., a thermostat) that communicates with the communicating device 104 via communication medium 102. Further, the communicating device 108 is a computer processor (or alternatively a computerized workstation) located locally or remotely with respect to the communicating device 104. The communicating device 108 is used for operational testing or field testing of the communicating device 104. However, it will be appreciated that in alternative embodiments, a communicating device may comprise any other device or combination of devices that are suitable for processing (i.e. constructing, sending, receiving, relaying, and/or otherwise handling) a communication over a communication medium. In any event, the communication between any two of communicating devices 104, 106, 108, and 110 may be performed by a communicating device sending and/or receiving, via communication medium 102, one or more messages formatted in accordance with a communication protocol. The one or more messages may be constructed or deconstructed by software being executed by a microprocessor or a similar digital processing unit or device disposed in or nearby, or associated with, the respective sending or receiving communicating device. For example, a sending communicating device may construct a message for transmission via communication medium 102 using an encoding unit or a similar device. Also, for example, a receiving communicating device may deconstruct a message detected on and/or received from communication medium 102 using a decoding unit or a similar device. In this embodiment, each communicating device 104, 106, 108, or 110 includes a respective encoder/decoder (e.g., codec) device 112, 114, 116, or 118. In alternative embodiments, a digital processor may be used instead of an encoder or decoder device to perform a similar function (e.g., constructing or deconstructing messages).

Figure 2:
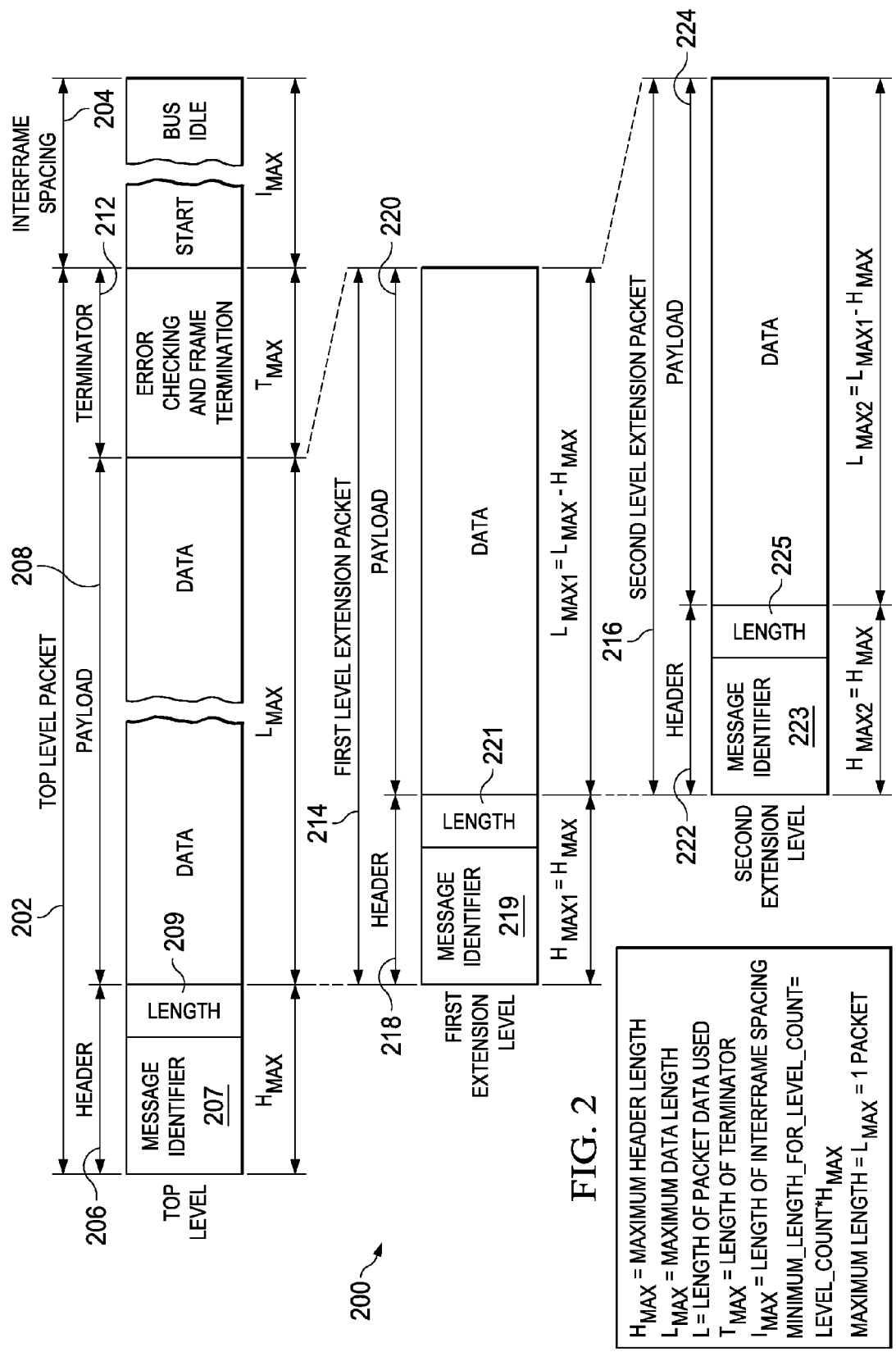
FIG. 2 is a block diagram depicting a format for one or more messages that may be sent on or received from a communication medium, in accordance with the principles disclosed herein.

FIG. 2 is a block diagram depicting a format 200 for one or more messages that may be sent on or received from communication medium 102, in accordance with the principles disclosed herein. Methods and/or techniques of embedding and/or nesting messages are described below as being accomplished in association with format 200. However, alternative embodiments may include embedding and/or nesting messages in a substantially similar manner, but instead, in association with a protocol having a format different from that of format 200.

Format 200 is a communication format for a manufacturer-specific message that may be sent or received by a communicating device 104, 106, 108, or 110 via communication medium 102. In this embodiment, the communication medium comprises a three wire system for transferring messages between communicating devices. However, in other embodiments, a communication medium may be a communication bus, a wireless communication medium, a wireline communication medium (e.g., other than a bus), a fiber optics communication medium, or the like. Further, in other embodiments, a communication medium may comprise a combination of two or more of the above-described or other communication mediums.

Format 200 comprises a top level packet 202 having a variable length. Alternative embodiments of a format may comprise a data packet having a fixed length. In further alternative embodiments, a format comprises a frame or message having a fixed length or a variable length. However, it will be appreciated that in embodiments where a data packet has a fixed length or a fixed length payload, other technical limitations apply to the implementation of the presently disclosed embedding techniques. For example, a fixed length packet cannot have a header of 5 bytes and a fixed length payload of 4 bytes. The spacing between top level packet 202 and the next frame, data packet, or message in a time-sequence of frames, data packets, or messages is depicted as the interframe spacing field 204. The length of the interframe spacing is of variable length and has a maximum length of $I_{MAX}$. Note that although a specific message format or data packet structure is shown as a specific implementation in FIG. 2, this particular format or structure is provided for illustrative purposes and is not intended to impose any limitations on the breadth of coverage or scope of the invention. Also, it is important to note that the top level packet 202 may reside, at least temporarily, in a computer-readable storage medium such as, for example, in a random-access memory storage area or a buffer storage area. Such storage may occur prior to transmission of the top level packet 202 by a communicating device via communication medium 102 or subsequent to a detection and/or reception of the top level packet 202 by a communicating device from communication medium 102.

The top level packet 202 comprises a header field 206, a payload field 208, and a terminator field 212. The terminator field 212 may include error detection (checksum) and acknowledgement but also serves to terminate the top level packet 202. The header field 206 is of variable length and has a maximum header length of $H_{MAX}$. The header field 206 may specify the start of top level packet 202, the level of priority that the top level packet 202 should have, and the class or type of message contained in the top level packet 202. The header field 206 further comprises information that identifies the specific message contained in the top level packet 202, i.e. using a message identifier 207. Further, the header field may comprise information that specifies the type of service (e.g., Arbitration/Quality of Service, QoS) the top level packet 202 should have and information that specifies the length of the payload field 208, i.e. using a length identifier 209.

The payload field 208 is of variable length up to a maximum length of $L_{MAX}$ and contains the data or specific message to be transported in the top level packet 202. However, in alternative embodiments of a packet, a payload may be of a different length and/or may be of a fixed length. When the top level packet 202 is used in HVAC systems or applications, the payload field 208 carries a manufacturer-specific control message. The terminator field 212 may further signify the end of the top level packet 202. The terminator field 212 is of variable length and has a maximum terminator length of $T_{MAX}$.

Notably, in accordance with the principles disclosed herein, FIG. 2 also shows a plurality of extension packets (or messages), specifically, a first level extension packet 214 and second level extension packet 216 that are embedded or contained and transported within top level packet 202. It will be appreciated that the terms "extension packet" and "extension message" are meant to identify any packet or message that is nested, encapsulated, and/or otherwise carried by another packet or message that is substantially compliant with the same protocol and/or format. Consequently, as described in more detail below, a top level packet or message that is formatted in accordance with a particular protocol may be configured to include one or more extension packets or messages that also comply with the format of that particular protocol. The principles illustrated in FIG. 2 also enable a user to increase the number and/or type of messages that can be sent or received under the particular protocol involved. The carrying of an extension packet 214, 216 within the top level packet 202 may be referred to as packet "nesting" so that extension packets 214, 216 are nested and/or carried within top level packet 202.

More specifically, nesting the first level extension packet 214 within top level packet 202 serves to extend the protocol by including the protocol-compliant first level extension packet 214 as data within the payload field 208 of the top level packet 202. The protocol may further be extended by nesting a second level extension packet 216 or message as data within the payload field 220 of the first level extension packet 214. In alternative embodiments of a top level packet, further subsequent levels of extension packets may be embedded within the payload field 224 of the second level extension packet. In those alternative embodiments, subsequent nesting of further levels of extension packets may be included until the overall remaining free space within the payload of the top level packet is too small to accommodate another nested extension packet. Further, it will be appreciated that a nested extension packet cannot exceed the length of the payload field of the packet in which the nested extension packet is to be carried.

Referring again to first level extension packet 214 as depicted in FIG. 2, the header field 218 may comprise information signifying the start of the first level extension packet 214 as well as information that specifies the level of priority that the first level extension packet 214 should have. The header field 218 further comprises information that specifies the class or type of message, i.e. a message identifier 219, contained in the first level extension packet 214. The header field 218 may further comprise information that signifies the specific message contained in the first level extension packet 214 and information that specifies the type of service (e.g., QoS) the first level extension packet 214 should have. The header field 218 further comprises information that specifies the length of the payload field 220, i.e. a length identifier 221. The header field 218 is of variable length and has a maximum length $H_{MAX1}=H_{MAX}$. The overall length of first level extension packet 214 may not exceed the maximum possible length of the payload field 208 of the top level packet 202. Further, the length of the payload field 220 is a variable length and has a maximum length $L_{MAX1}$ where $L_{MAX1}=L_{MAX}-H_{MAX}$.

Similarly, referring to second level extension packet 216 as depicted in FIG. 2, the header field 222 may comprise information signifying the start of the second level extension packet 216 and information that specifies the level of priority that the second level extension packet 216 should have. The header field 222 further comprises information that specifies the class or type of message, i.e. a message identifier 223, contained in second level extension packet 216. The header field 222 may further comprise information that signifies the specific message contained in the second level extension packet 216 and information that specifies the type of service (e.g., QoS) the second level extension packet 216 should have. The header field 222 further comprises information that specifies the length of the payload field 224, i.e. a length identifier 225. The header field 222 is of variable length and has a maximum length $H_{MAX2}$ where $H_{MAX2}=H_{MAX}$. The overall length of second level extension packet 216 may not exceed the maximum possible length of the payload field 220 of the first level extension packet 214. Further, the length of the payload field 224 is of variable length and has a maximum length $L_{MAX2}$ where $L_{MAX2}=L_{MAX1}-H_{MAX}$. It will be appreciated that in some embodiments, portions of and/or all of the header field 222 may optionally be excluded, thereby allowing the payload field 224 to account for and equal the entire size and/or length of the second level extension packet 216.

The top level packet 202 represents a message on a top level while first level extension packet 214 and second level extension packet 216 represent messages on a first extension level and a second extension level, respectively. The number of different levels can be counted such that FIG. 2 depicts a level count equal to three (3). Accordingly, a minimum length required for a specific level count value can be calculated using the relationship, MINIMUM_LENGTH_FOR_LEVEL_COUNT=LEVEL_COUNT*$H_{MAX}$.

Figure 3:
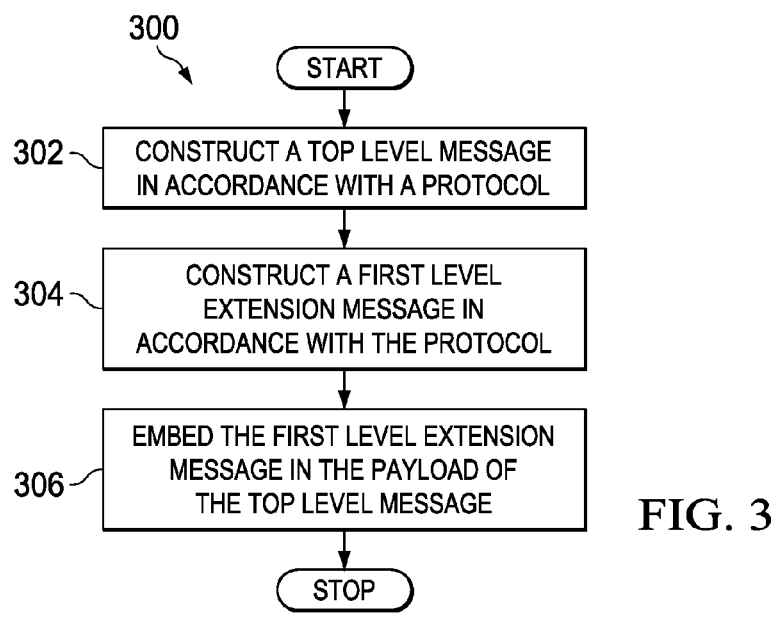
FIG. 3 is a flowchart that depicts a method of extending a communication protocol that may be implemented in accordance with the principles disclosed herein.

FIG. 3 depicts a flowchart of a method 300 of extending a communication protocol, which may be implemented in accordance with the principles disclosed herein. Referring to FIGS. 1, 2 and 3 for illustrative purposes, in some embodiments, the method may begin with an encoder 112, 114, 116, or 118, which is associated with or disposed in a respective communicating device 104, 106, 108, or 110, encoding or constructing a top level message in accordance with a predetermined protocol format (step 302). In one embodiment, the top level message may be embodied as or be similar in structure or format to that of top level packet 202 shown in FIG. 2. In other embodiments, a digital processor (e.g., microprocessor) associated with or disposed in the communicating device and executing suitable software or a firmware application may be used to construct the top level message. In any event, the constructed or encoded top level message may be stored temporarily in a suitable computer-readable storage medium disposed in or associated with the communicating device.

The encoder (or digital processor) for that communicating device may then encode or construct a first level extension message in accordance with the predetermined protocol format (step 304). For example, the first level extension message may be embodied as or be similar in structure or format to that of first level extension packet 214 shown in FIG. 2. As such, the first level extension message may be suitably formatted to comply with the protocol of the top level message. In some embodiments, for example, the first level extension message may be constructed to include a header field and payload field that are formatted substantially similar to those of the top level message. In some of those embodiments, the first level extension message may exclude, for example, one or more of a start bit in the header field, an error detection and acknowledgement field, and a trailer field. In others of those embodiments, for example, one or more of the start bit, error detection and acknowledgement field, and trailer field may be included in the first level extension message if desired. In any event, it is preferable to format or structure at least the header and payload of the first level extension message similar enough to the format or structure of the top level message so that the first level extension message may be protocol-compliant along with the top level message.

The encoder (or digital processor) for that communicating device may then embed the first level extension message into the payload field of the top level message (step 306). For example, in some embodiments, a digital processor disposed in or associated with that communicating device may retrieve the top level message from the computer-readable storage medium, and insert the data packet representing the first level extension message into the payload field of the top level data packet or message. In other embodiments, for example, the encoder (or digital processor) for that communicating device may encode or construct a top level message that includes a first level extension message in the payload of the top level message during the time period while the top level message is being constructed.

This method of embedding one or more protocol-compliant messages into the payload fields of one or more higher-level messages may be continued and used to construct additional extension messages or packets (e.g., more than two extension messages or packets) and thus additionally increase the number and/or type of messages that may be used in accordance with a particular communication protocol. However, as the number and/or type of messages are increased by this method, the maximum payload size of each successive embedded message may be decreased, for example, according to the previously described relationship, $L_{MAX1}=L_{MAX}-H_{MAX}$.

In some embodiments, in order for a communicating device to send or transmit one or more of the above-described embedded messages via a communication medium, the communicating device may use an encoder to encode an embedded extension message into the payload or data section of a top level (e.g., protocol-compliant) message. A processing unit disposed in the communicating device may then store the extension message in a suitable queue to await transmission on the communication medium involved. For reception of an extension message from a communication medium, a communicating device may use a decoder to extract an extension message from the payload or data section of a top level (e.g., protocol-compliant) message. A processing unit may then copy the extension message into a reception buffer, as if the extension message were a standard top level message. Thus, the embedded extension message may be processed as a standard top level message utilizing an already existing application and/or software framework.

Figure 4:
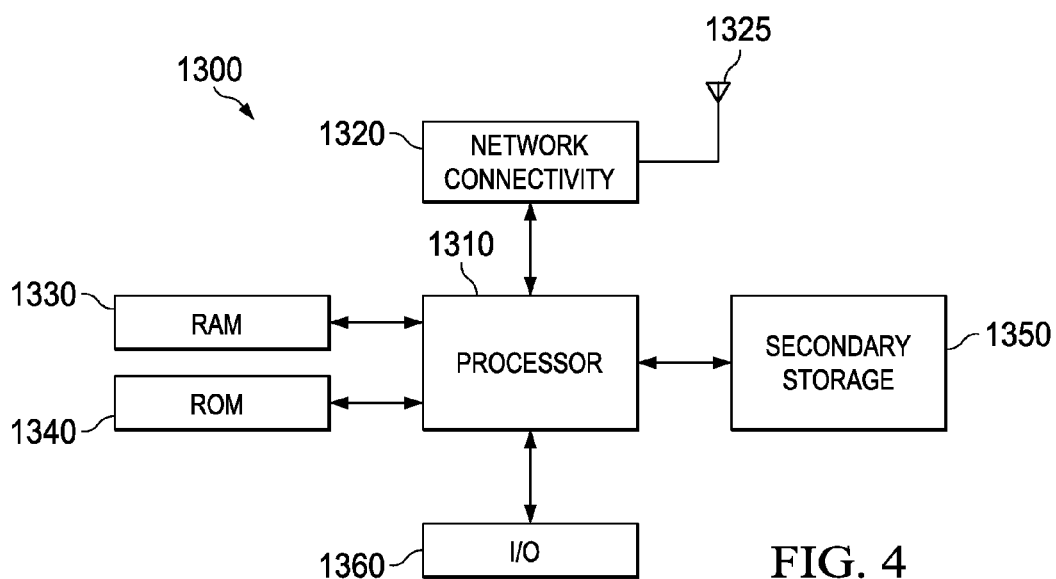
FIG. 4 illustrates a general-purpose processor (e.g., electronic controller or computer) system suitable for implementing the several embodiments of the present disclosure.

Referring now to FIG. 4, as explained above, components of the communication system 100 may comprise a processing component and the processing component may be a processor and/or a component of a computer system. FIG. 4 illustrates a typical, general-purpose processor (e.g., electronic controller or computer) system 1300 that includes a processor 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive. While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described FIG. 1.

While numerous embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other techniques, systems, subsystems or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for extending a building automation communication protocol, the communication protocol comprising a number of message identifiers including a standard message identifier configured to cause a predefined functionality, an HVAC manufacturer-specific message identifier configurable by a manufacturer to cause a manufacturer definable functionality, and an unused message identifier, the system comprising:

a memory; and at least one HVAC device configured to cooperate with the memory to construct a top level message having the HVAC manufacturer-specific message identifier in accordance with the communication protocol, the at least one HVAC device configured to construct a first level extension message having the unused message identifier, the first level extension message having the unused message identifier being associated with a second manufacturer definable functionality, and the at least one HVAC device further configured to retain protocol compliance by embedding the first level extension message in a data component of the top level message; wherein the first level extension message having the unused message identifier is associated with a functionality external to functionality associated with the standard message identifier and external to functionality associated with the HVAC manufacturer-specific message identifier.

2. The system of claim 1, wherein the data component of the top level message comprises a payload section of the top level message.

3. The system of claim 1, wherein the data component of the top level message comprises a data field and the top level message comprises a top level data packet.

4. The system of claim 1, wherein the top level message comprises at least one manufacturer-specific control message of a first plurality of manufacturer-specific control messages, and the first level extension message having the unused message identifier comprises at least one manufacturer-specific control message of a second plurality of manufacturer-specific control messages.

5. The system of claim 1, wherein the at least one HVAC device is further configured to construct a second level extension message in accordance with the communication protocol and embed the second level extension message in a data component of the first level extension message.

6. The system of claim 1, wherein the at least one HVAC device comprises at least one of an encoder unit and a processing unit configured to construct at least one of the top level message and the first level extension message.

7. The system of claim 1, wherein the top level message comprises at least one of a header field, a payload field, and a terminator field.

8. The system of claim 1, wherein the first level extension message comprises a header field and a payload field.

9. The system of claim 1, wherein the at least one HVAC device is configured to dispose the first level extension message within a data section of a top level data packet.

10. The system of claim 1, wherein the at least one HVAC device comprises a processor.

11. The system of claim 1, wherein the at least one HVAC device is further configured to receive a top level message from a communication medium, determine whether a first level extension message is included within the received top level message, and when a first level extension message is included within the received top level message, extract the first level extension message from the received top level message and store the first level extension message in a non-transitory computer-readable storage medium.

12. A method of extending a communication protocol for a distributed control system, the protocol comprising a set of message identifiers comprising a standard message identifier associated with a standard message, an HVAC manufacturer-specific message identifier, and an unused message identifier, the method comprising:
   receiving a top level message having the HVAC manufacturer-specific message identifier from a communication medium;
   determining whether a first level extension message having the unused message identifier is included within the top level message; and
   when the first level extension message is included within the top level message, extracting the first level extension message from the top level message and storing the first level extension message in a non-transitory computer-readable storage medium;
   wherein the first level extension message having the unused message identifier is associated with a functionality external to functionality associated with the standard message identifier and external to functionality associated with the HVAC manufacturer-specific message identifier.

13. The method of claim 12, wherein the communication medium comprises a communication bus.

14. The method of claim 12, wherein the top level message comprises a protocol-compliant manufacturer-specific control message.

15. The method of claim 12, wherein the determining step comprises determining whether the first level extension message is included within a payload of a data packet associated with the top level message.

16. The method of claim 12, wherein the receiving, determining, and extracting steps comprise:
   receiving a top level data packet including the top level message;
   determining whether the first level extension message is included within a data section of the top level data packet; and
   when the first level extension message is included within the data section of the top level data packet, extracting the first level extension message from the data section of the top level data packet and storing the first level extension message in a receive buffer of a communicating device.

17. The method of claim 12, wherein the communication medium comprises at least one of a wireless communication medium, a wireline communication medium, and a fiber optics communication medium.

18. A system for extending a communication protocol, the protocol comprising a set of message identifiers comprising a standard message identifier associated with a standard message, an HVAC manufacturer-specific message identifier, and an unused message identifier, the system comprising:
   a memory; and
   at least one HVAC processor configured to cooperate with the memory to construct a top level packet having the HVAC manufacturer-specific message identifier, configured to construct a first level extension packet having the unused message identifier, and configured to retain protocol compliance by embedding the first level extension packet within the top level packet;
   wherein at least one of the top level packet and the first level extension packet having the unused message identifier comprises a manufacturer-specific message for use in an HVAC system; and
   wherein the first level extension packet having the unused message identifier is associated with a functionality external to functionality associated with the standard message identifier and external to functionality associated with the HVAC manufacturer-specific message identifier.

19. The system of claim 18, wherein the at least one HVAC processor is further configured to construct a second level extension packet having a second unused message identifier and the at least one HVAC processor is further configured to embed the second level extension packet within the first level extension packet having the unused message identifier.

* * * * *